United States Patent Office 3,801,634
Patented Apr. 2, 1974

3,801,634
MANUFACTURE OF ACRYLIC ACID
Richard Krabetz, Kirchheim, Carl-Heinz Willersinn, Ludwigshafen, Heinz Engelbach, Limburgerhof, Hermann Wistuba, Mannheim, Ulrich Lebert, Ludwigshafen, and Walter Frey, Mannheim, Germany, assignors to Badische Anilin- & Soda-Fabrik Aktiengesellschaft, Ludwigshafen (Rhine), Germany
No Drawing. Filed Nov. 18, 1971, Ser. No. 200,178
Claims priority, application Germany, Nov. 18, 1970, P 20 56 614.7
Int. Cl. C07c 57/04, 51/32
U.S. Cl. 260—533 N         6 Claims

ABSTRACT OF THE DISCLOSURE

The oxidation of propylene to acrylic acid in two stages via acrolein using conventional oxidation catalysts proceeds particularly well when the activity of the catalysts in the two stages increases in the direction of flow of the reaction gases and the off-gases from the second stage are recycled to the first stage as diluting gases.

This invention relates to a process for the manufacture of acrylic acid by oxidation of propylene in two stages via acrolein as intermediate, using oxidic catalysts.

It is known to oxidize propylene to acrylic acid in the gas phase in the presence of oxygen-containing gases and steam and at an elevated temperature in contact with solid catalysts in two stages. In the first stage, the propylene is mainly converted to acrolein, and the resulting gas mixture is passed to the second stage without separation of the acrolein, where it is oxidized to acrylic acid in contact with a second catalyst.

Catalyst systems proposed for the first stage contain elements in Groups IVa to VIa, VIII and IVb to VIIb. Of these catalyst systems, tellurium-containing catalysts (catalysts containing tellurium dioxide or telluric acid or catalysts which contain bismuth or antimony with or without phosphorus) are distinguished by their particularly high selectivity in the formation of acrolein at a relatively low temperature of the saltpeter bath usually used for this reaction. Suitable catalysts are those containing oxides of molybdenum, tungsten and tellurium or the oxides of cobalt, molybdenum and tellurium. Other catalysts which have been proposed contain, for example, iron, tin, antimony, vanadium, or nickel, cobalt, iron, bismuth, phosphorus and molybdenum in addition to oxygen, optionally with additions of samarium oxide and tantalum oxide. The manufacture and use of the first-mentioned catalyst systems for the oxidation of propylene to acrolein is described, for example, in British Pats. 1,193,489 and 1,243,794.

Catalysts which have been found satisfactory for use in the second stage are also oxidic catalysts in the aforementioned groups but with the restriction that generally no elements in Groups Va and VIa may be used, and in particular no or only very little selenium or tellurium may be used, in order that the acrolein may be further oxidized to acrylic acid as completely as possible. Known catalysts contain, for example, cobalt and molybdenum or molybdenum, tungsten and vanadium, or tin, antimony and molybdenum in addition to oxygen.

It is advantageous to use catalysts which contain, in addition to oxygen, molybdenum, tungsten and iron and/or nickel and/or manganese and/or copper and, optionally, vanadium. The manufacture of these catalysts and their use in the oxidation of acrolein to acrylic acid is described in British Pat. 1,213,325 and Canadian Pat. 868,940.

The ultimate object of the teachings given in said literature is to obtain acrylic acid in an absolute yield which is as high as possible on the propylene introduced, whilst other factors or significance in carrying out these processes are not considered to a desirable extent.

One of the most important criteria is the space-time yield and the concentration of the acrylic acid in the condensate obtained. Considerable difficulties have been met in attempts to obtain high space-time yields and high condensate concentrations in industrial apparatus. Industrial single-stage or multistage processes for the synthesis of acrylic acid by gas-phase oxidation in the prior art are only capable of removing the locally occurring heat of reaction with the rapidity necessary for high conversions in a single pass when very uneconomical measures are adopted. For example, it is necessary to use tubes of narrow cross-section or to operate at low temperatures and thus with small amounts of catalyst and low throughputs (linear gas velocities) and, moreover, the gas to be oxidized must be protected from explosive combustion at the catalysts or at least from over-oxidation leading to undesirable by-products by dilution with large amounts of steam (up to 40% by volume). Relatively good absolute yields of acrylic acid, which may be as high as 50% of theory or more based on propylene introduced, are obtained, but an uneconomically high energy input and high investment costs are incurred because it is necessary to use low space velocities (long residence times) and the resulting acrylic acid is obtained in very dilute aqueous solution.

It has thus been desirable to make the entire process more economical by improving the space-time yield whilst having recourse to the previously worked-out methods of obtaining high absolute yields in a single pass. It is an object of the invention to provide a safe oxidation process in which over-oxidation of the kind mentioned above is minimized and explosive combustion processes are reliably obviated.

These and other objects are achieved in a process for the manufacture of acrylic acid by oxidation of propylene with elementary oxygen and gas mixtures containing inert, steam-containing diluting gases in reaction tubes packed with catalysts in a first stage, in which propylene is substantially oxidized to acrolein, and in a second stage, in which further oxidation to acrylic acid occurs, the initial propylene concentration being above 2% molar based on the initial gas mixture and the space velocity in both stages being greater than 60 liters propylene per hour per liter of catalyst per stage, in which process the activity of the catalysts in the two stages is varied so that the activity at the inlet end of the reaction tubes is less than 100% and increases steadily or stepwise to 100% at the outlet end, and the off-gases obtained at the outlet of the second reaction stage are substantially freed from condensible gases and recycled to the first stage as inert diluting gases which partly or completely replace the steam.

The acrylic acid does not occur in an unduly dilute state, so that subsequent working up to pure acrylic acid requires considerably less time and energy. There was a prejudice against such measures, as one would have thought that the absolute yield would fall markedly on account of the dilution of the active catalyst composition. Surprisingly, this is not the case. The meaures of the invention enable a system of the kind under consideration to be operated at substantially higher space velocities, which means that the throughput may be raised considerably without danger, the absolute yield obtained in the process of the invention being, as hitherto, about 50% on propylene introduced. Another advantage gained in diluting the catalyst is that when the synthesis gas is replaced by recycled reaction gases, which are known to have a substantially lower heat capacity than steam, the risk of over-oxidation and local overheating is dispelled. The process of the invention constitutes a big economical improvement over conventional processes, since this second measure enables acrylic acid to be obtained in condensate concentrations of up to 50% by weight.

The process of the invention is carried out as follows:

Irrespective of any particular catalyst system, propylene concentrations of more than 2% molar based on the starting mixture are used at space velocities of more than 60 liters of propylene per hour, and the bath temperatures used are those required for a propylene or acrolein conversion of more than 80–85% molar.

The reaction of this gas mixture is carried out in the presence of a catalyst of which the active composition is diluted with inert material so that the activity of the catalyst is reduced. This dilution is effected in such a manner that the activity of the catalyst rises steadily or stepwise from the inlet end to the outlet end of the reaction tubes to reach a final value of 100%, which value is conveniently reached at some distance from the outlet end of the reaction tube. Advantageously, from 5 to 50% by weight of the total catalyst composition is diluted in the manner proposed by the invention. Of particular industrial interest is a dilution of from 10 to 30% by weight. In other words, the activity of the catalyst reaches 100% at a point upstream of the half-way point of the reaction tube. The amount of dilution in the diluted part of the catalyst bed decreases at a rate dependent on the linear gas velocity. The amount of reduction of catalyst activity must be greater the higher the linear gas velocity, if the occurrence of uncontrollable hot spots is to be avoided. According to the present invention, at linear gas velocities of more than 60 cm./s. (calculated for a reaction tube without packing), the activity of the catalyst, i.e. the proportion of active catalyst composition, in the diluted portion of the catalyst bed conveniently rises from 0 to 100%. Advantageously, the initial dilution is such that the amount of active composition is from 25 to 75%, this being raised until it reaches 100%. The catalyst may be diluted with any material which is inert to the reaction, is stable at temperatures of at least 600° C. and preferably at least 700° C., is substantially non-porous and does not combine with the components of the catalyst under the conditions of the reaction. Suitable materials are, for example, highly calcined oxides of aluminum, zirconium, titanium, magnesium and silicon, the higher-melting silicates and aluminosilicates, electrode graphite, cement compositions, high-melting sintered compositions, preferably steatite, $\alpha$-alumina and silicon carbide.

Dilution is conveniently effected by mechanically mixing catalyst moldings with moldings of inert material of substantially the same shape or by mixing catalyst and inert material both in finely powdered form followed by shaping.

The reaction gases obtained at the end of the second reaction stage are freed from acrylic acid, steam and other condensible products by cooling and are mixed with the starting gas mixture entering the first reaction stage and mainly consisting of propylene, air and possibly steam, the mixing rate being such that, taking into consideration the unreacted propylene and the oxygen contained in the recycled off-gas, the total propylene concentration of the gases entering the first catalyst bed is more than 2% and preferably from 4 to 8% molar of the total gas mixture and the molar ratio of propylene to oxygen to water is 1:1.5 to 4:0 to 3 and preferably 1:2–3:0–2.

In the process of the invention the catalysts used in the first stage advantageously contain molybdenum, tungsten and tellurium in addition to oxygen, the atomic ratio of molybdenum to tungsten being from 0.03 to 40:1 and preferably from 0.2 to 25:1, and the content of tellurium being from 0.2 to 2% and preferably from 0.5 to 1.8% by weight, and the catalysts used in the second stage advantageously contain molybdenum, tungsten and iron and/or nickel and/or manganese and/or copper in addition to oxygen and optionally vanadium, the atomic ratio of molybdenum to tungsten to iron (nickel, manganese, copper) being from 1 to 20:0.01 to 10:1 and preferably from 2 to 10:0.1 to 2:1 and the ratio of molybdenum to vanadium being 6:0.2 to 6 and preferably 6:0.5 to 4. Other catalysts suitable for the first and second stages of the process are those commonly used for the oxidation of propylene to acrolein or of acrolein to acrylic acid as described, for example, in German printed applications 1,924,496 and 2,000,425, Belgian Pats. 689,720; 746,202 and 738,250, the published Dutch patent application 7011603 and Japanese patent application 45/22,525 published in 1970.

The measures proposed by the invention make it possible to carry out the process at high throughputs of more than 100 liters of propylene (STP) per liter of catalyst per stage and linear gas velocities of more than 60 and preferably more than 100 cm./s. (STP) calculated for the reaction tube without packing, and bath temperatures associated with conversions of more than 80 and preferably more than 85% and with acrylic acid yields of more than 45–50% molar based on propylene introduced.

Examples 1–9

The following examples clearly show that the space-time yield is approximately 2 to 3 times higher when the reaction gases are passed over a catalyst which is initially highly diluted and then shows a steady or stepwise increase in concentration in the manner proposed by the invention than when undiluted catalysts are used. Recycling of the off-gases or part thereof to the process (Example 9) to replace the steam produces no further increase in the space-time yield but doubles the concentration of acrylic acid in the aqueous solution obtained.

The experiments were carried out as follows: A mixture of propylene (98%), air, steam and optionally nitrogen and containing 1.8% v./v. of carbon monoxide was passed through a two-stage apparatus consisting of two series-connected steel tubes of 4 m. in length and 25 mm. in diameter. The tubes were electrically heated, stirred salt baths. The gases entering the tubes were passed over heat exchangers to be preheated or cooled as necessary to reach the temperature of the particular salt bath. The reaction gas leaving the second stage at a temperature of from 200° to 300° C. was cooled in a two-stage quencher system with the condensate produced. The catalyst packing used in the first stage was a molybdenum/tungsten/tellurium catalyst, and in the second stage it was a molybdenum/tungsten/vanadium/iron catalyst, both catalysts being in the form of 3 x 3 mm. pellets. The initial layers of the catalysts were diluted with steatite spheres having a diameter of 3 mm.

The following table gives details of the amount of catalyst used, the degree of dilution, the gas rates, bath temperatures and conversions, acrylic acid yields, yields of residual acrolein at the end of the second stage (in each case based on the 98% propylene introduced to the first stage, the space-time yields and the condensate concentration of the acrylic acid product.

TABLE 1

| Example | Catalyst packing (ml.) | | Gas rates (l./hr.) | | | | Bath temperature (° C.) for— | | Conversion of $C_3H_6$ (percent molar) | Yields (percent molar) of— | | STY[1] | Concentration of acrylic acid in condensate (percent w./w.) |
|---|---|---|---|---|---|---|---|---|---|---|---|---|---|
| | Tube 1 | Tube 2 | $C_3H_6$ | Air | $H_2O$ | $N_2$/CO | Tube I | Tube II | | Acrylic acid | Residual acrolein | | |
| 1 | 600 [2] (100) | 300 [2] (100) | 36 | 420 | 196 | | 340 | 250 | 92 | 45 | 4 | 1.1 } | 18–20 |
| 2 | 1,000 [2] (100) | 500 [2] (100) | 60 | 720 | 336 | | 340 | 250 | 88 | 30/40 | 3 | 1.2/1.8 } | |
| 3 | { 400 [2] (25)<br>900 [2] (100) | 500 [2] (100) | 60 | 720 | 336 | | 325 | 260 | 94 | 55 | 1.6 | 2.2 | |
| 4 | { 400 [2] (25)<br>900 [2] (100) | { 400 [2] (25)<br>400 [2] (100) | 60 | 720 | 336 | | 330 | 270 | 95 | 58 | 1.1 | 2.3 | |
| 5 | { 400 [2] (25)<br>1,100 [2] (100) | { 400 [2] (25)<br>500 [2] (100) | 90 | 1,080 | 504 | | 325 | 271 | 92 | 56 | 1.1 | 3.4 | |
| 6 | { 200 [2] (25)<br>150 [2] (33)<br>100 [2] (50)<br>1,050 [2] (100) | { 400 [2] (25)<br>700 [2] (100)<br>700 [2] (100)<br>700 [2] (100) | 120 | 1,440 | 660 | | 342 | 255 | 94 | 60 | 1.5 | 5.6 | 24.5 |
| 7 | 1,050 [2] (100) | 700 [2] (100) | 120 | 1,440 | 390 | | 330 | 256 | 89 | 53 | 1.3 | 4.4 | 30 |
| 8 | { 120 [2] (25)<br>210 [2] (35)<br>140 [2] (50)<br>1,030 [2] (100) | { 120 [2] (25)<br>210 [2] (35)<br>140 [2] (50)<br>630 [2] (100) | 120 | 1,440 | 820 | | 340 | 272 | 95 | 53 | 1.4 | 4.4 | 20.3 |
| 9 | 1,030 [2] (100) | 630 [2] (100) | 120 | 1,440 | 147 | 824 | 335 | 272 | 92 | 53 | 1.5 | 4.4 | 43.6 |

[1] Space-time yield expressed as kg. of acrylic acid per tube per day.
[2] These percentages are percentages by volume of active composition.

Examples 10–17

Using catalysts manufactured by known methods, a mixture of fresh propylene, fresh air and recycle gas and containing 100 parts by volume per hour of propylene, 252 parts by volume per hour of oxygen, 50 parts by volume per hour of steam and 1,728 parts by volume per hour of inert gases (mainly nitrogen and small amounts of carbon oxides) is oxidized in two series-connected reaction tubes in two stages at the temperatures given in the following Table 2. The composition of the catalysts is given in Table 2. The catalysts used in the first stage have an activity of 25% over the first 0.091 part by volume, as considered in the direction of flow of the gas mixture, an activity of 50% over the following 0.12 part by volume and an activity of 100% over the remaining 0.91 part by volume; whilst the catalysts used in the second stage have an activity of 50% over the first 0.091 part by volume and an activity of 100% over the remaining 0.73 part by volume. The activity of the catalysts was reduced to the desired values by dilution with inert solids (steatite spheres of 3 mm. in diameter). The catalysts themselves were in the form of 3 x 3 mm. pellets. The recycled gas is off-gas from the second stage from which the condensible reaction products have been virtually completely washed out.

The following Table 2 lists the proportion of acrylic acid in the condensate, the yield of acrylic acid, the conversion of the propylene and the space-time yield of the acrylic acid in each case.

catalyst is 0.91 part by volume of the catalyst given in Example 1 of German printed application DOS 2,038,763 and having an activity of 100%. A gas mixture of 100 parts by volume per hour of propylene, 1,200 parts by volume per hour of air and 780 parts by volume per hour of steam is passed through the series-connected reaction tubes. The bath temperature for the first tube is 362° and for the second tube 410° C. The propylene conversion is 92% molar, the space-time yield is 1.9 parts by weight per tube per day and the yield of acrylic acid is 25% molar on propylene introduced. The acrylic acid is contained in the condensate in a concentration of only 14% by weight.

We claim:

1. In a continuous process for the manufacture of acrylic acid by catalytic oxidation of propylene with elementary oxygen and an inert gas mixture normally containing steam as an inert diluting gas in reaction tubes packed with catalysts in two stages including a first stage, in which propylene is substantially oxidized to acrolein, and a second stage, in which further oxidation to acrylic acid occurs, at elevated temperatures sufficient to provide a conversion of propylene or acrolein of more than 80–85% molar, the improvement which comprises:

continuously carrying out said catalytic oxidation with an initial propylene concentration of above 2% molar based on the initial gas mixture and a rate of flow of the propylene in both stages of greater than 60 liters per hour of catalyst per stage, the activity

TABLE 2

| Ex. | Catalyst | | Bath temp. (° C.) | | Acrylic acid in condensate (percent w./w.) | Conversion of $C_3H_6$ (mol percent) | Yield of acrylic acid (mol percent) | STY[1] |
|---|---|---|---|---|---|---|---|---|
| | Stage I | Stage 2 | Stage I | Stage 2 | | | | |
| 10 | $Mo_{10}Ni_{7.5}Cr_1Fe_{0.33}Bi_{0.83}Sn_{0.8}$ on 30% $Si_2O^2$ | $Mo_6W_1V_1Fe_{1.5}$ [3] | 362 | 260 | 52 | 91 | 52 | 4.0 |
| 11 | do.[2] | $Mo_{12}V_{3.8}Sb_1$ on alumina pellets [4] | 390 | 420 | 39 | 76 | 39 | 3.0 |
| 12 | $Mo_{10}Ni_{7.5}Cr_1Fe_{0.33}Bi_{0.83}Ge_1$ on 30% $SiO_2$ [5] | $Mo_6W_1V_1Fe_{1.5}$ [3] | 360 | 260 | 51 | 94 | 53 | 4.1 |
| 13 | $Mo_{10}Ni_{10}Co_{0.3}Fe_1P_1Bi_1$ + 1% $Sm_2O_3$ on 33% Al-silicate.[6] | $Mo_6W_1V_1Fe_{1.5}$ [3] | 390 | 260 | 50 | 79 | 50 | 3.9 |
| 14 | $Mo_{12}Ni_1Co_3Fe_2Bi_1P_2K_{0.2}$ on 30% $SiO_2$ [7] | $Mo_6W_1V_1Fe_{1.5}$ [3] | 390 | 260 | 52 | 62 | 44 | 4.3 |
| 15 | $Mo_7Ni_{0.7}Cr_2Te_{0.35}$ | $Mo_6W_1V_1Fe_{1.5}$ [3] | 400 | 270 | 47 | 79 | 38 | 2.9 |
| 16 | $Mo_4W_8Te_{0.25}$ [8] | $Mo_6W_1V_{1.5}Fe_{1.5}$ [3] | 365 | 250 | 53 | 94 | 54 | 4.2 |
| 17 | do.[8] | $Mo_{12}V_{3.8}Sb_1$ on alumina pellets [4] | 365 | 410 | 51 | 90 | 52 | 4.0 |

[1] Space-time yield expressed in parts by weight of acrylic acid per tube per day.
[2] DOS 2,000,425, Example 1.
[3] Belgian Patent 746,202.
[4] DOS 2,038,763, Example 1.
[5] DOS 2,000,425, Example 6.
[6] Belgian Patent 738,250, Example 1.
[7] DOS 2,020,791, Example 1.
[8] British Patent 1,243,794.

Comparative example (cf. Example 11)

The same apparatus is used as that employed in Examples 10 to 17 but in the first stage the catalyst used is 1.12 parts by volume of the catalyst given in Example 1 of German printed application DOS 2,000,425 and having an activity of 100%, whilst in the second stage the of the catalysts in each of the two stages being varied by dilution with inert material so that the activity at the inlet end of each reaction tube is reduced to about 25 to 75% and then gradually increases steadily or stepwise up to 100% at a spaced interval from the outlet end of each reaction tube;

and then freeing the off-gases obtained at the outlet of the second reaction stage from condensible gases and recycling the non-condensed gas to the first stage as an inert diluting gas which at least partly replaces steam.

2. A process as claimed in claim 1, wherein the activity of the catalyst reaches 100% upstream of the mid-way point of the reaction tube.

3. A process as claimed in claim 1 wherein 5 to 50% by weight of the total catalyst composition in each stage is diluted to the required extent.

4. A process as claimed in claim 1 wherein 10 to 30% by weight of the total catalyst composition in each stage is diluted to the required extent.

5. A process as claimed in claim 1 wherein the propylene concentration entering the first stage is about 4 to 8% molar of the total gas mixture and the molar ratio of propylene:oxygen:water is 1:1.5 to 4:0 to 3.

6. A process as claimed in claim 1 wherein the throughput of propylene is more than 100 liters (STP) per liter of catalyst per stage and the linear gas velocity based upon a reaction tube without packing is more than 60 cm./sec. (STP).

References Cited

FOREIGN PATENTS 738,087   3/1970   Belgium _____ 260—533 N

LORRAINE A. WEINBERGER, Primary Examiner

R. D. KELLY, Assistant Examiner

UNITED STATES PATENT OFFICE
CERTIFICATE OF CORRECTION

Patent No. 3,801,634      Dated April 2, 1974

Inventor(s) Richard Krabetz et al

It is certified that error appears in the above-identified patent and that said Letters Patent are hereby corrected as shown below:

Columns 5&6, Table 1, the items in parenthesis in the columns "Catalyst packing (ml.)", "Tube 1" and "Tube 2", should have -- % -- inserted behind them.

Columns 5&6, Table 1, "Catalyst packing (ml.), Tube 2" column, example 3, second line, delete "$500^2(100)$", example 6, third line, delete "$700^2(100)$", example 6, fourth line, delete "$700^2(100)$".

Column 5, line 34, "part" should read -- parts --.

Column 5, line 36, "part" should read -- parts --.

Column 5, line 38, "part" should read -- parts --.

Column 5, line 40, "part" should read -- parts --.

Column 5, line 41, "part" should read -- parts --.

Signed and Sealed this

Third Day of August 1976

[SEAL]

Attest:

RUTH C. MASON
*Attesting Officer*

C. MARSHALL DANN
*Commissioner of Patents and Trademarks*